Figure 1:
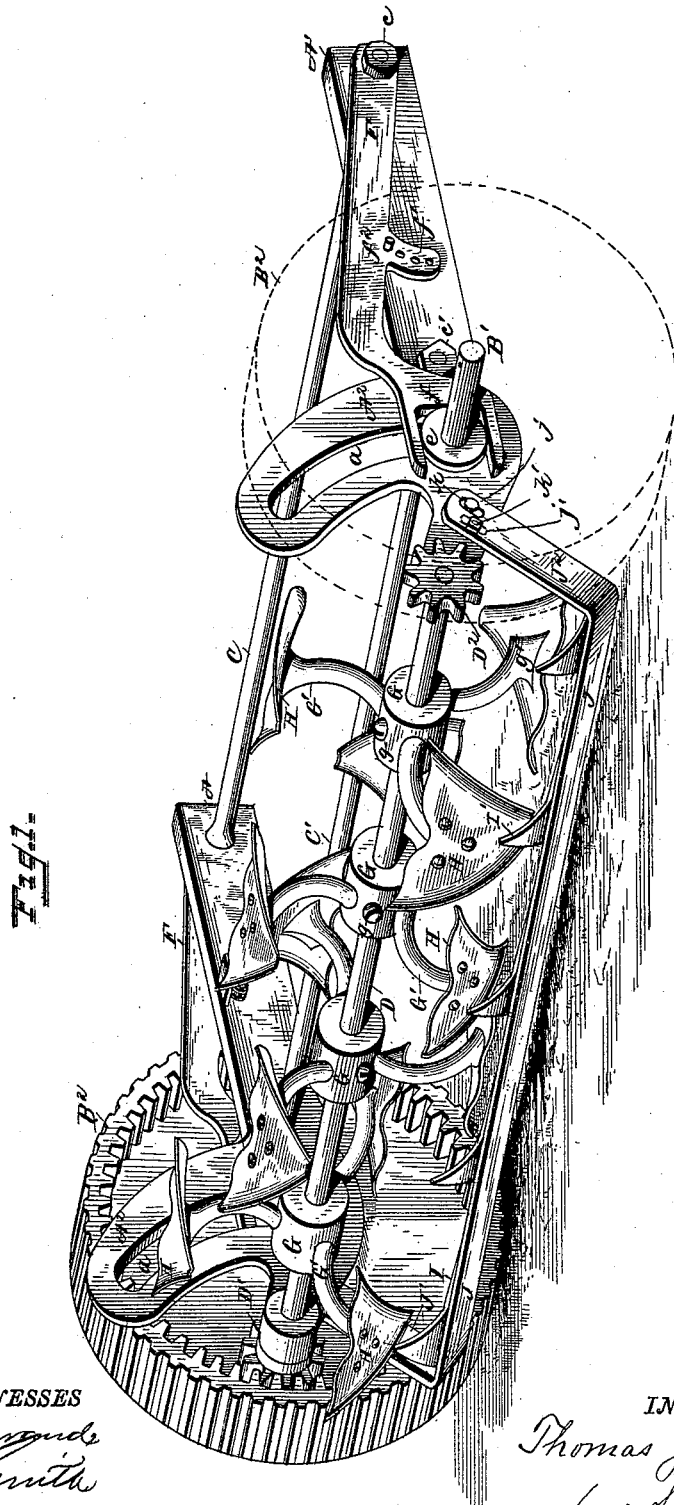

(No Model.)  2 Sheets—Sheet 1.

T. J. PERRIN.
LAWN MOWER.

No. 340,240.  Patented Apr. 20, 1886.

WITNESSES  INVENTOR
F. L. Ormsnde  Thomas J. Perrin
Rex Smith  by A. M. Smith
  Attorney N. PETERS, Photo-Lithographer, Washington, D. C.

(No Model.) 2 Sheets—Sheet 2.
T. J. PERRIN.
LAWN MOWER.
No. 340,240. Patented Apr. 20, 1886.
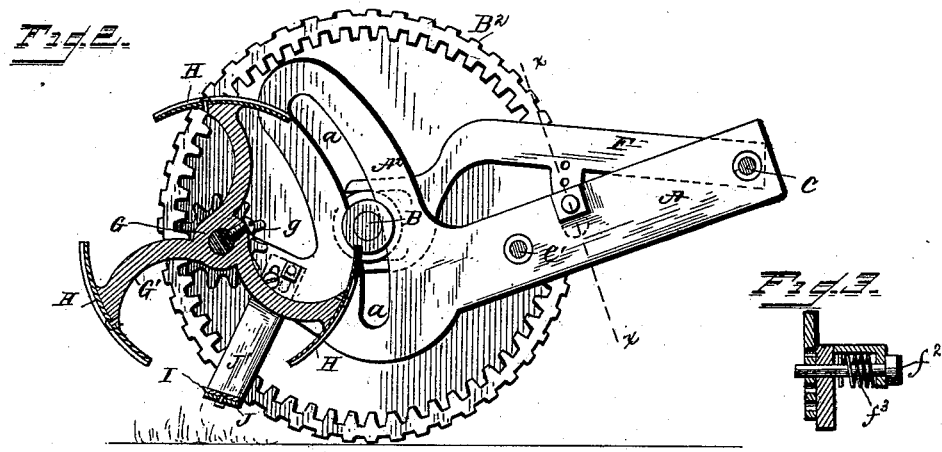
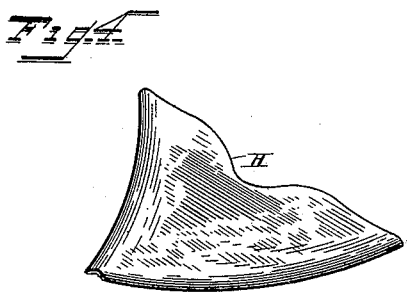
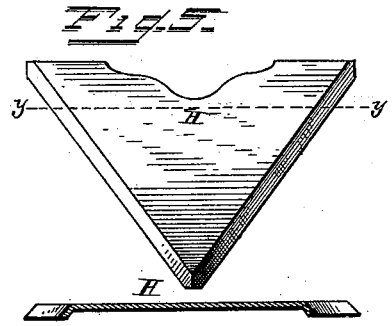
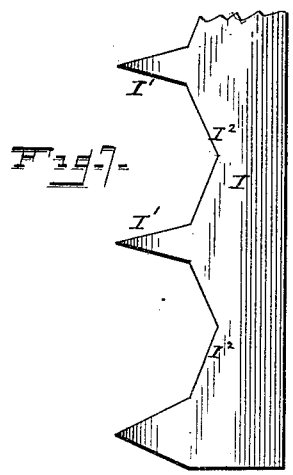
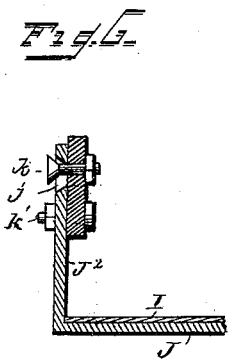
WITNESSES
F. L. Ouzande
Rex Smith
INVENTOR
Thomas J. Perrin
by A. M. Smith
Attorney

UNITED STATES PATENT OFFICE.

THOMAS J. PERRIN, OF SPRINGFIELD, OHIO, ASSIGNOR OF ONE-HALF TO WILLIAM PERRIN, OF SAME PLACE.

LAWN-MOWER.

SPECIFICATION forming part of Letters Patent No. 340,240, dated April 20, 1886.

Application filed July 31, 1885. Serial No. 173,145. (No model.)

*To all whom it may concern:*

Be it known that I, THOMAS J. PERRIN, of Springfield, county of Clark, State of Ohio, have invented a new and useful Improvement in Lawn-Mowers, of which the following is a full, clear, and exact description, reference being had to the accompanying drawings, making part of this specification.

My invention relates to the construction of the knives and to the means for effecting the adjustment of the height of cut; and it consists in the construction of the knives each in the form of a flat spear-head curved on its cutting-edges, and made concavo-convex in form from point to heel in an arc of a circle conforming to the curved path in which the knives are made to rotate, and in the combination of said knives with arms or heads fast on a shaft rotating on a horizontal axis.

It further consists in the combination, with the frame to which the stationary knife is secured and in which the shaft of the rotary knives is mounted, and with the drive-wheel axles, also mounted in said frame, of adjusting forks or lever-arms for adjusting the frame, and with it the cutting apparatus, for regulating the height of cut, and in certain details of construction and arrangement, hereinafter described and claimed.

In the accompanying drawings, Figure 1 is a perspective view of my improved mower, with one of the main ground or driving wheels removed, its position being indicated in dotted lines. Fig. 2 represents a vertical longitudinal section through the same; Fig. 3, a vertical transverse section through one of the side bars of the frame and one of the adjusting forks or levers, showing the retaining-pin in elevation. Fig. 4 is a perspective view of one of my improved knives detached. Fig. 5 represents a plan view and a section on line *y y* of said plan view, showing a modification in the form of the knife. Fig. 6 is a vertical transverse section through one of the side bars of the frame and the upturned end of the stationary knife-bar connected therewith, showing the manner of securing said knife-bar to the frame; and Fig. 7, a plan view of a portion of the ledger-plate.

A and A' represent the two longitudinal side bars of the main frame, which extend for the greater part of their length in rear of the axle or axles B and B', and are connected in rear of said axles by shouldered rods or bars C and C', having screw-threaded ends, which pass through the bars A and A', and are secured by nuts *c c'* outside of said bars, which firmly clamp the latter against the shoulders on the rods C and C', said shoulders serving to hold the side bars at the desired distance apart. The bar C is at or near the rear ends of the side bars, and may serve as the handle for propelling the machine; or other suitable handle or tongue may be employed, attached to the frame in any usual or preferred manner.

The side bars, A and A', are provided near their forward ends with standards or vertically-expanded portions $A^2$, having slots *a* formed in them, curved in the arc of a circle, of which the secondary or pinion shaft D, mounted in suitable bearings in the forward ends of the bars A and A', is the center, in such manner that the adjustment of the frame up and down on the axle passing through or engaging said slotted standards may be effected without disturbing the working relation of the driving-wheels on said axle or axles to said pinion-shaft. I prefer to use stud-axles B and B', as shown, though a through or common axle for the driving-wheels $B^2$ may be used, if desired. These stud-axles are formed upon or rigidly secured to grooved axle-blocks, which fit snugly within the slots *a*, in such manner as to adapt the slotted frame-bars A and A' to slide up and down on them. The outer portions of these grooved blocks are by preference made in the form of cylindrical hubs, as shown at *e*, which are engaged by the forks *f* on the forward ends of two arms or levers, F and F', arranged one on each side of the frame and pivoted at their forward ends on the ends of the rod C, outside of the side bars, A and A', as shown. These levers are provided near the center of their length with pendent arms or ears *f'*, curved in the arc of a circle, of which the pivotal rod C is the center, and provided each with a series of perforations, into any one of which a pin, $f^2$, passing through one of the side bars, may enter, for holding the frame at any desired adjustment on the lever. By withdrawing the pins $f^2$, adjusting the forward end of the frame up and down on the axle-blocks, and again inserting the pins in the proper perforations in levers F and F', the forward end of the frame, and with it the cutting apparatus, as will be seen, may be set and held at any desired height above the ground, the forks in the arms serving to hold the axles in the desired relation to the frame for that purpose. The pins $f^2$ are held in engagement with the levers F and F' by means of springs $f^3$, the arrangement of the latter for this purpose being shown in Fig. 3; but any suitable means may be used for holding the frame and levers at the desired relative adjustment. Slots in the ends of the levers F and F' will answer the same purpose as the forks $f$.

The wheels $B^2$ have inwardly-projecting peripheral flanges cogged on their inner faces, and pinions D' and $D^2$ on the shaft D engage therewith for imparting motion to said shaft. Upon this shaft D are a number of hubs, G, which are secured to the shaft by means of set-screws $g$, the points of which enter sockets in the shaft and insure the rotation of the hubs therewith and prevent their lateral displacement thereon. These hubs are provided each with a series of radial arms, G', made, by preference, in curved form concave on the faces toward the points of the cutters, as adapting the outer ends to clear themselves more readily from the cut grass, and provided at said ends with heads $g'$, of triangular or other suitable form, for firmly supporting the knives H, secured to their outer faces. The form of these knives is shown in the perspective view, Fig. 4, as substantially that of a flattened spearhead, convexed on its cutting-edge and from point to heel on its outer face, and concave at its edges on the same face in cross-section. The curvature from point to heel conforms to the circle in which the knife moves, carried by the arm G', and of which the shaft D is the center, and the concavity from side to side of its outer face is such as to adapt it to be ground or sharpened on said face by being placed flatwise on the grinding-surface. The same result may be reached by beveling the edges, as shown in Fig. 5, instead of curving them. The knives thus formed are secured to the outer faces of the heads $g'$ by means of rivets, bolts, or screws, preferably such as will adapt them to be easily removed for sharpening and replaced or new ones substituted.

The stationary cutter consists of a straight steel blade or ledger-plate, I, secured to the upper face of an angular bar, J. The latter is made from a flat bar of metal, horizontal for the main portion of its length, with its ends turned upward at right angles to the body of the bar and secured to the outer faces of the side frame-bars, A and A', by suitable through-bolts, as shown. Each upturned end J' or $J^2$ of bar J is secured by means of two bolts or screws, (indicated in Fig. 6,) the upper one, $k$, passing through a slot, $j$, in the end J' or $J^2$, having beveled sides or walls, to receive a round or oval-shaped head on the bolt or screw, which screws into the threaded perforations in the frame-bar. The second bolt, $k'$, passes in a similar manner from the inner side through a slot, $j'$, in the frame-bar, and into a threaded perforation in the upturned end of the bar J. By withdrawing the bolts or screws the bar J and cutter may be removed for sharpening, after which, when replaced with the bolts in position, by tightening the upper bolt or screw, $k$, its head will be drawn inward, and, being made to act on the inclined upper wall of slot $j$, serves to draw the end of bar J up with it until the ledger-plate is drawn into close shearing relation to the rotating knives H, after which the bolt or screw $k'$ can be tightened and made to hold the bar J and cutter I firmly in such relation. The ledger-plate I is by preference stamped or cut from bar or sheet steel, and provided on its forward cutting-edge with V-shaped fingers I', which taper to a point, and are curved from the heel or junction with the body of the plate to the point in an arc of a circle concentric with the axis of the rotating cutters, and the latter are so arranged as to move in vertical planes or paths between the vertical longitudinal planes of adjacent fingers I', with their cutting-edges adapted to act in conjunction with the sides of the latter with a shearing action, which has been found very effective in practice. The forward edge of the plate I may be scalloped or cut away between the fingers I', as shown at $I^2$, thereby giving increased length of shearing-edge to the ledger-plate, and reducing the quantity to be cut at any given point.

The operation of the parts will be readily understood. As the machine is propelled, the forward rotation of the drive-wheels imparts a rapid rotation in the same direction to the knives H, and these from their form are adapted to readily enter the grass from above, and then to crowd it back against the stationary knife I, over which they move with a shearing action, best adapted to the cutting of grass or grain. The hubs carrying the rotating knives are by preference so placed upon and secured to the shaft D as to give to the knives a spiral relation, (indicated in Fig. 1,) whereby said knives, instead of acting together and with a succession of blows or a chopping action, are made to follow one another in quick succession, thereby making the power required to operate them uniform and steady, and utilizing all the tractive power of the machine, which can consequently be made much lighter than would otherwise be practicable.

I would state that I do not wish to be restricted to lawn-mowers in the use of my improvements, as I desire to use them as far as practicable in other forms of mowing-machines, and also in reaping grain.

Having now described my invention, I claim as new—

1. The knives made in the triangular or spear-head form, convex on their outer faces from point to heel, and with their cutting-edges bent outward, adapting them to be ground on their outer faces, substantially as described.

2. The combination of the triangular or flattened spear-head-shaped cutters with the shaft rotating on a horizontal axis, and a fixed or stationary blade or cutter, substantially as described.

3. The side bars of the main frame, provided with the slotted standards adapted to be adjusted on the drive-wheel axle or axle-blocks, as described, in combination with the forked lever-arms, and means for holding said arms and the frame-bars and axle at the desired relative adjustment, substantially as described.

4. The combination of the main frame, the stud-axles secured thereto, the forked lever-arms for setting and holding the frame and axles at the desired relative adjustment, the rotating cutter-shaft mounted in bearings in said frame, and the adjustable stationary cutter secured to said frame, all arranged and operating substantially as described.

5. The stationary cutter or ledger-plate provided with the curved tapering fingers, in combination with the curved and rotating spear-head cutters, substantially as described.

In testimony whereof I have hereunto set my hand this 28th day of July, A. D. 1885.

THOMAS J. PERRIN.

Witnesses:
JAMES CARSON,
B. WINWOOD DIEHL.